United States Patent
Mooers

[11] Patent Number: 5,904,281
[45] Date of Patent: May 18, 1999

[54] VEHICLE RACK SYSTEM

[76] Inventor: Jim Mooers, 4310 Susquehana Ave., Wildwood, N.J. 08260

[21] Appl. No.: 08/730,623
[22] Filed: Oct. 11, 1996
[51] Int. Cl.[6] .................. B60R 9/06; B60R 9/08
[52] U.S. Cl. .................. 224/526; 224/518; 224/525; 224/529; 224/922
[58] Field of Search .................. 224/922, 518, 224/525, 526, 529, 524, 498, 499

[56] References Cited

U.S. PATENT DOCUMENTS

| | | | |
|---|---|---|---|
| D. 364,374 | 11/1995 | Womberly | 280/47 |
| 1,625,808 | 4/1927 | Hyde | 224/526 |
| 3,103,290 | 9/1963 | Perri | 224/526 |
| 4,915,276 | 4/1990 | Devito | 224/526 |
| 5,033,223 | 7/1991 | Minter | 43/21.2 |
| 5,205,446 | 4/1993 | Greenberg | 224/922 |
| 5,310,103 | 5/1994 | Weber | 224/311 |
| 5,435,473 | 7/1995 | Larkum | 224/922 |
| 5,460,306 | 10/1995 | Rudd | 224/922 |
| 5,484,092 | 1/1996 | Cheyney | 224/404 |

Primary Examiner—Linda J. Sholl

[57] ABSTRACT

A vehicle rack system (10) removably connectable to a vehicle (22) has horizontal top members forming a circumference therebetween having sufficient size to accommodate a cooler (20) therein. The vehicle rack system (10) further has horizontal bottom members forming a circumference therebetween having sufficient size to accommodate the cooler (20) therein. The vehicle rack system (10) further has a vertical rod holders having a vertical rod holder slotted ends positioned at an upper distal end is securely fastened to a the horizontal top members and to the horizontal bottom members. The vehicle rack system (10) further comprises a vertical front rod holder receivers securely fastened to a front end of the horizontal top members and to a front end of the horizontal bottom members. The vehicle rack system (10) further comprises a left vehicle connector (18L) is securely fastened to a left end of the front horizontal bottom member (12FBT) and the rear horizontal bottom member (12RBT). The left vehicle connector (18L) comprises a left vehicle connector tab (18LA) is removably fastenable to the vehicle left tow bracket (22L). The rear horizontal bottom member (12RBT) comprises a right vehicle connector tab (18RA) which is removably fastenable to the vehicle right tow bracket (22R).

8 Claims, 3 Drawing Sheets

VEHICLE RACK SYSTEM

BACKGROUND OF THE INVENTION

1. Field of the Invention

The present invention relates to a vehicle rack system. More particularly, the present invention relates to a vehicle rack system having removable rotatable fishing rod holders and sufficient size to accommodate a cooler therein.

2. Description of the Prior Art

Vehicle rack systems are novel in the art. Previous systems have a simple platform upon which a cooler can be strapped thereto. In addition, there are rod holders generally made of PVC pipe which persons strap or fasten onto a vehicle's bumper. These systems are very crude in design, lack structural integrity as well as versatile functionality as described and claimed in the present invention.

Numerous innovations for vehicle rack system have been provided in the prior art that are described as follows. Even though these innovations may be suitable for the specific individual purposes to which they address, they differ from the present invention as hereinafter contrasted.

In U.S. Pat. No. 5,484,092, titled Vehicle Storage Box with Double Secured Compartments, invented by Dale S. Cheney, a truck storage box comprising a rectangular box arranged for mounting in a standard pickup truck bed to extend thereacross and includes an two independent storage compartments, a first larger storage compartment and a second smaller storage compartment which is locked within the interior of the first storage compartment. The structures are preferably formed of steel, or like materials. The second storage compartment is particularly adapted for holding elongated, flat articles such as tools, guns, fishing rods or other appropriate items. In some instances, the second storage compartment is hinged to the interior of the lid of the larger storage compartment and the second storage compartment can be accessed only when the first storage compartment is opened and when the second storage compartment is unlocked.

In U.S. Pat. No. D364,374, titled ATV Rod Carrier, invented by Larry E. Elliott, the ornamental design for the ATV rod carrier is as shown and described.

In U.S. Pat. No. 5,340,135, titled Hand Truck for Fishing Equipment, invented by Johnnie V. Womberly, a hand truck for fishing equipment includes various modifications providing for the removable carriage of a variety of equipment and tackle associated with the sport of fishing. The hand truck includes one or more tubes attached to the side(s) of the frame side member(s), providing for the insertion of the butt(s) or handle(s) of fishing rod(s) therein, thus keeping the center of the truck clear and precluding obstructing the user of the truck with any fishing rod(s) carried thereon. The central portion of the truck includes a hook providing support of the handle of a bait bucket or the like therefrom. The lower platform or shelf of the truck provides for the carriage of an ice chest or cooler and a tackle box thereon. Laterally disposed tiedowns are secured to the truck frame for securing such large articles to the truck. The truck provides not only for the transport of such equipment, but may also serve as a seat with back rest when the user reaches his/her desired fishing site, by removing the tackle box from the truck and using the ice chest as a seat and the truck frame as a back support.

In U.S. Pat. No. 5,310,103, titled Vehicle Truck Lid Mounted Accessory Carrier Case Assembly, invented by Melvin W. Weber and Robert L. Olson, an accessory carrier case assembly mountable on a support structure, such as the underside of a vehicle trunk lid, includes an elongated case having a latchable bottom tray and top lid. The bottom tray and top lid are padded with a foam material. The bottom tray has an interior structure defining different compartments for various items of fishing equipment. The top lid and bottom tray have sufficient interior space for accommodating fishing rods therein. The accessory carrier case assembly also includes an arrangement of rigid mounting brackets, flexible holding straps, and flexible hook and lop releasable fastening strips for supporting the carrier case on the underside of the trunk lid. The releasable fastening strips are applied respectively on the holding straps and on either the top lid or bottom tray of the carrier case for releasably supporting the carrier case from the underside of the trunk lid.

The above described patented inventions differ from the present invention because they lack one or more of the following features as a left vertical rear rod holder, a left vertical middle rod holder, a left vertical front rod holder receiver having a fishing rod holder insertable therein, a right vertical rear rod holder, a right vertical middle rod holder, a right vertical front rod holder receiver having a fishing rod holder insertable therein, an upper "box" constructed from a left horizontal top member connected to a right horizontal top member connected to a front horizontal top member connected to a rear horizontal top member, and a lower "box" constructed from a left horizontal bottom member connected to a right horizontal bottom member connected to a front horizontal bottom member connected to a rear horizontal bottom member.

Numerous innovations for vehicle rack system have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a vehicle rack system. More particularly, the present invention relates to a vehicle rack system having removable rotatable fishing rod holders and sufficient size to accommodate a cooler therein.

The types of problems encountered in the prior art are coolers remain at a colder temperature during transportation if they are placed on an exterior of a vehicle.

In the prior art, unsucessful attempts to solve this problem were attempted namely: extending platforms upon which a cooler is strapped thereto. However, the problem was solved by the present invention because is has a left vehicle connector and a right vehicle connector which functions as a sturdy bottom support in conjunction with an upper "box" constructed from a left horizontal top member connected to a right horizontal top member connected to a front horizontal top member connected to a rear horizontal top member, and a lower "box" constructed from a left horizontal bottom member connected to a right horizontal bottom member connected to a front horizontal bottom member connected to a rear horizontal bottom member.

Innovations within the prior art are rapidly being exploited in the field of off road vehicle accessories.

The present invention went contrary to the teaching of the art which teaches platforms having coolers strapped thereto.

The present invention solved a long felt need for a sturdy multi functional cooler/fishing rod holder mountable on an off road vehicle.

The present invention produced unexpected results namely: by securely placing a wet towel or burlap onto the top and/or sides of the cooler during transportation, the cooler remained much colder due to the respiratory properties thereof.

A synergistic effect was produced utilizing the present invention due to the following facts and results from experimentation: the vehicle rack system also functions as an external bumper to prevent the vehicle from being damages if a deer, kangaroo or other animal is hit while driving.

Accordingly, it is an object of the present invention to provide a vehicle rack system having the capability of removably and adjustably holding at least one fishing rod holder as well as a cooler thereon.

More particularly, it is an object of the present invention to provide a cooler holder consisting of a left vehicle connector and a right vehicle connector which functions as a sturdy bottom support in conjunction with an upper "box" constructed from a left horizontal top member connected to a right horizontal top member connected to a front horizontal top member connected to a rear horizontal top member, and a lower "box" constructed from a left horizontal bottom member connected to a right horizontal bottom member connected to a front horizontal bottom member connected to a rear horizontal bottom member. The upper "box" and the lower "box" having sufficient size slightly larger than an outer diameter of the cooler.

In keeping with these objects, and with others which will become apparent hereinafter, one feature of the present invention resides, briefly stated, in vertical members comprising left vertical rear rod holder having a left vertical rear rod holder slotted end, left vertical middle rod holder having a left vertical middle rod holder slotted end, left vertical front rod holder receiver, right vertical rear rod holder having a right vertical rear rod holder slotted end right vertical middle rod holder having a right vertical middle rod holder slotted end, and a right vertical front rod holder receiver.

When the left vertical front rod holder receiver is designed in accordance with the present invention, comprises a left member securely attached thereto.

In accordance with another feature of the present invention, the left member comprises a left member holder having a left member holder tension means.

Another feature of the present invention is that the left vertical front rod holder receiver comprises a right member securely attached thereto.

Yet another feature of the present invention is that the right member comprises a right member holder securely attached thereto having a right member holder tension means thereon.

Still another feature of the present invention is that the front horizontal top member and the front horizontal bottom member are reinforced by a front-left top-bottom member and a front-right top-bottom member therebetween which function to add strength thereto.

Yet still another feature of the present invention is that the rear horizontal top member and the rear horizontal bottom member are reinforced by a rear-left top-bottom member and a rear-right top-bottom member therebetween which function to add strength thereto.

Still yet another feature of the present invention is that the fishing rod holder comprises a fishing rod holder angled member having a fishing rod holder angled member slotted end is securely attached at a lower end to a fishing rod holder shaft.

Another feature of the present invention is that a cutting board is optionally receivably attachable to the left member and the right member.

Yet another feature of the present invention is that the cutting board comprises a cutting board cross member is securely attached to a cutting board plate.

Still another feature of the present invention is that the cutting board cross member is securely attached at opposite distal ends to a cutting board left member and a cutting board right member which are removably insertable into a left member holder and a right member holder, respectively.

Yet still another feature of the present invention is that a left vehicle connector and a right vehicle connector has a left vehicle connector tab and a right vehicle connector tab attached thereto.

Still yet another feature of the present invention is that the left vehicle connector and the right vehicle connector support a cooler thereon.

Another feature of the present invention is that the left vehicle connector tab and a right vehicle connector tab are securely attachable to a vehicle left tow bracket and a vehicle right tow bracket of a vehicle.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—vehicle rack system (10)
12LVR—left vertical rear rod holder (12LVR)
12LVRA—left vertical rear rod holder slotted end (12LVRA)
12LVM—left vertical middle rod holder (12LVM)
12LVMA—left vertical middle rod holder slotted end (12LVMA)
12LVF—left vertical front rod holder receiver (12LVF)
12RVR—right vertical rear rod holder (12RVR)
12RVRA—right vertical rear rod holder slotted end (12RVRA)
12RVM—right vertical middle rod holder (12RVM)
12RVMA—right vertical middle rod holder slotted end (12RVMA)
12RVF—right vertical front rod holder receiver (12RVF)
12LHT—left horizontal top member (12LHT)
12LBT—left horizontal bottom member (12LBT)
12RT—rear horizontal top member (12RT)
12RBT—right horizontal bottom member (12RBT)
12FHT—front horizontal top member (12FHT)
12FBT—front horizontal bottom member (12FBT)
12RT—rear horizontal top member (12RT)
12RB—rear horizontal bottom member (12RB)
12LA—left member (12LA)
12LAA—left member holder (12LAA)
12LAAA—left member holder tension means (12LAAA)
12RA—right member (12RA)
12RAA—right member holder (12RAA)
12RAAA—right member holder tension means (12RAAA)
12FLTB—front-left top-bottom member (12FLTB)
12FRTB—front-right top-bottom member (12FRTB)
12RLTB—rear-left top-bottom member (12RLTB)
12RRTB—rear-right top-bottom member (12RRTB)
14—fishing rod holder (14)
14A—fishing rod holder angled member (14A)
14AA—fishing rod holder angled member slotted end (14AA)

14B—fishing rod holder shaft (14B)
16—cutting board (16)
16A—cutting board plate (16A)
16B—cutting board cross member (16A)
16L—cutting board left member (16L)
16R—cutting board right member (16R)
18L—left vehicle connector (18L)
18LA—left vehicle connector tab (18LA)
18R—right vehicle connector (18R)
18RA—right vehicle connector tab (18RA)
20—cooler (20)
22—vehicle (22)
22L—vehicle left tow bracket (22L)
22R—vehicle right tow bracket (22R)

DESCRIPTION OF THE PREFERRED EMBODIMENT

Figure 1:
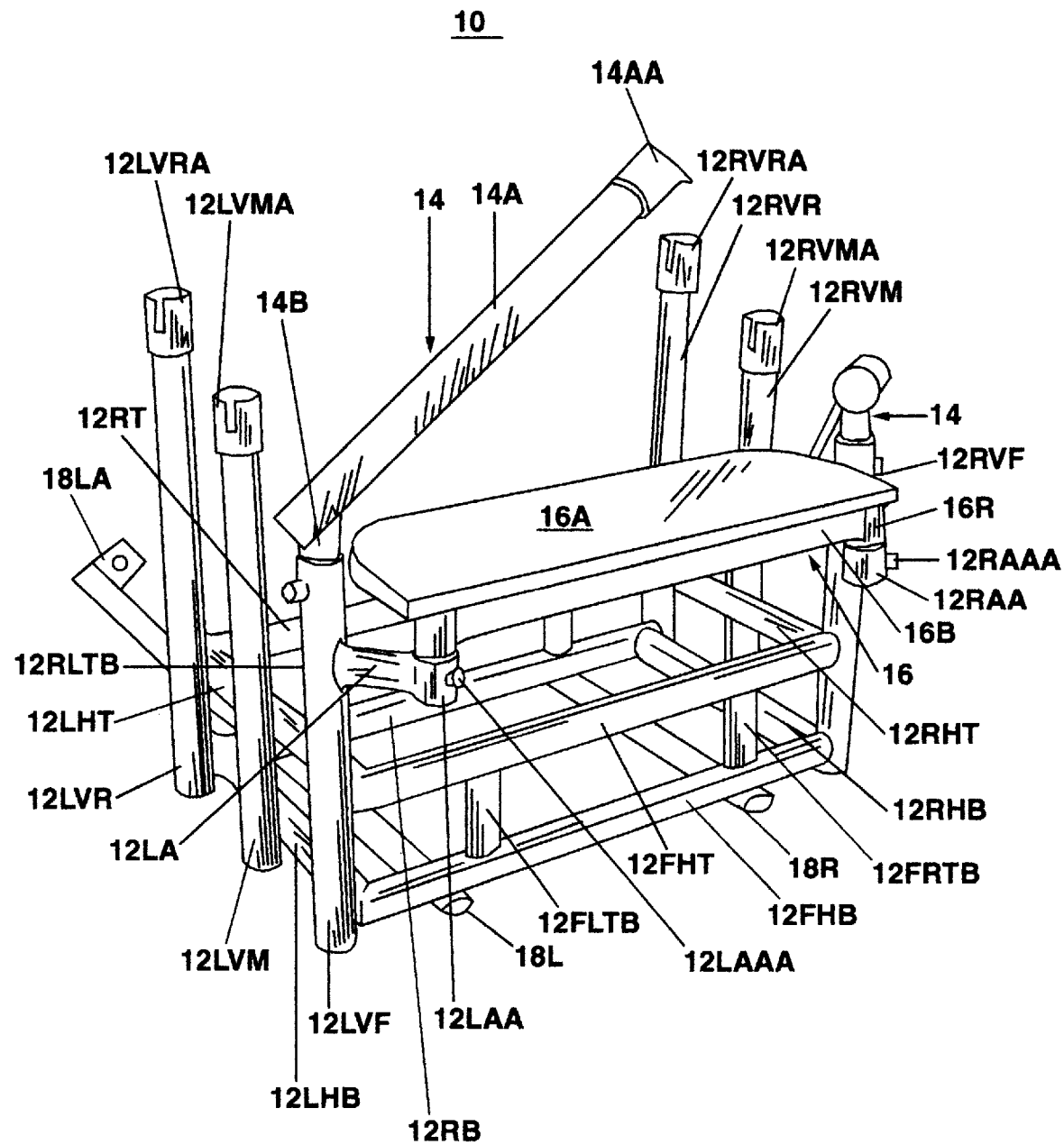
FIG. 1 is a front-left top perspective view of a vehicle rack system.
Figure 2:
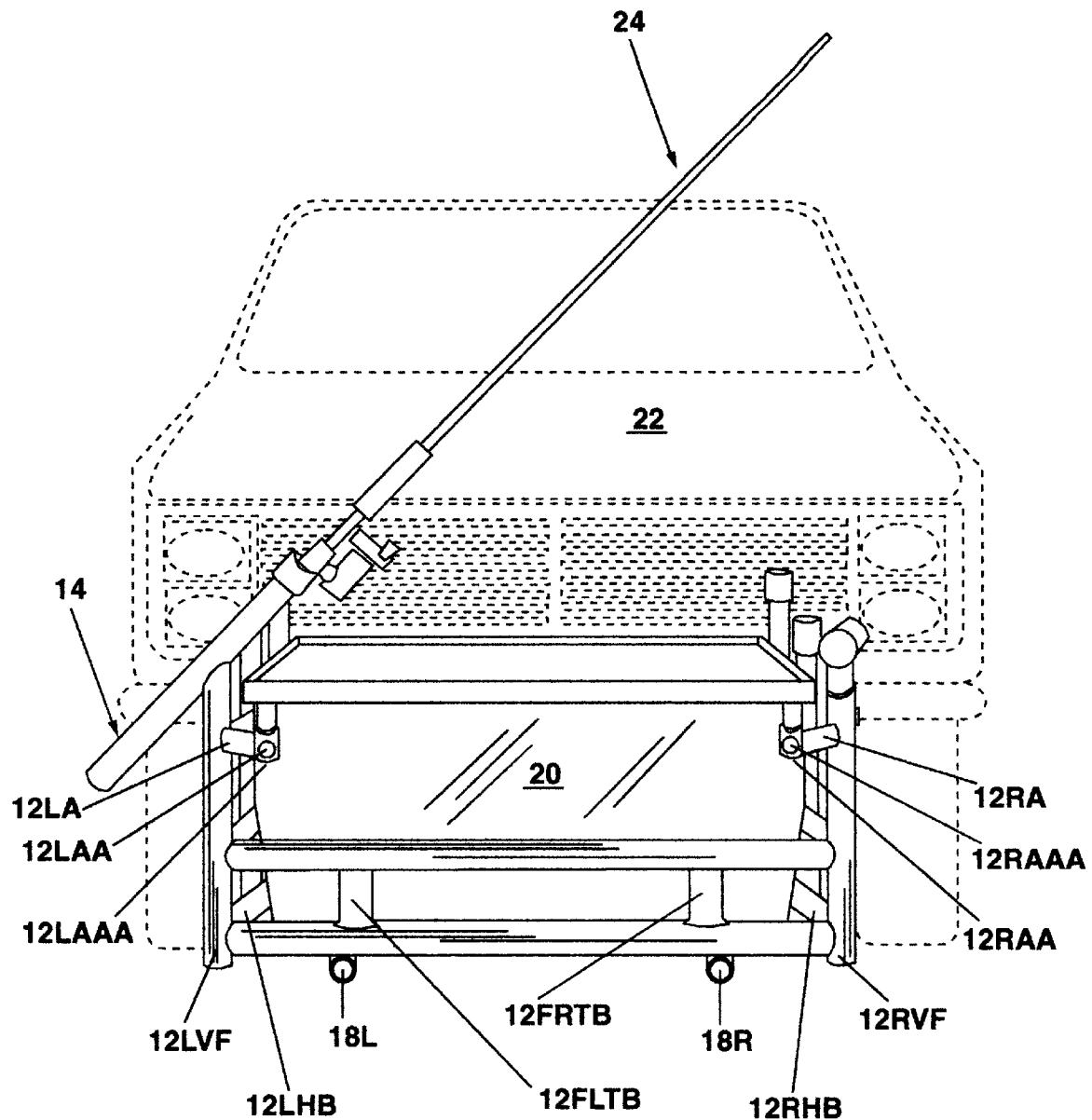
FIG. 2 is a front top perspective view of a vehicle rack system securely fastened to a vehicle.
Figure 3:
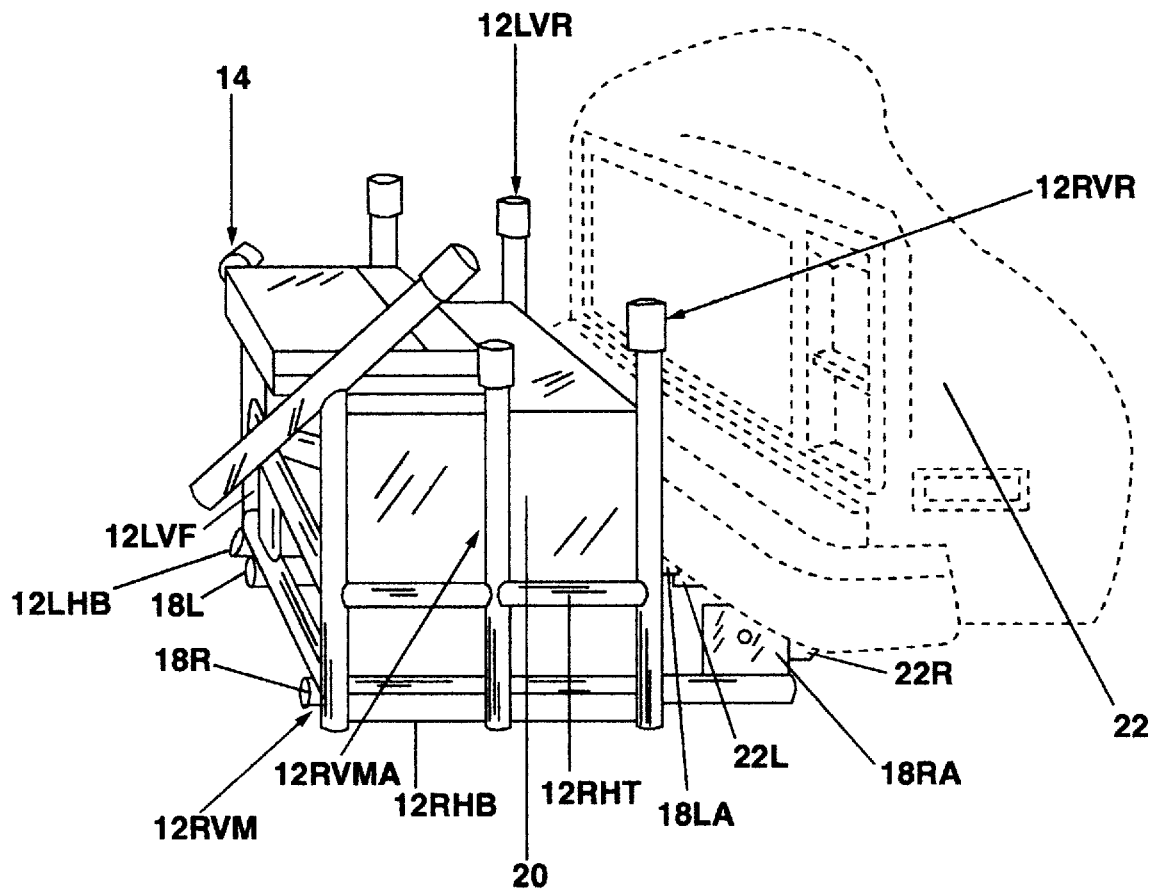
FIG. 3 is a left front top perspective view of a vehicle rack system securely fastened to a vehicle.

Firstly, referring to FIG. 1 which is a front-left top perspective view of a vehicle rack system (10). Secondly, referring to FIG. 2 and FIG. 3 which are a front top perspective view and a left front top perspective view, respectively of a vehicle rack system (10) securely fastened to a vehicle (22). The vehicle rack system (10) removably connectable to a vehicle (22) having a vehicle left tow bracket (22L) and a vehicle right tow bracket (22R). The vehicle rack system (10) comprises a left horizontal top member (12LHT) securely fastened at a rear distal end to a left distal end of a rear horizontal top member (12RT) which is securely fastened at a right distal end to a rear distal end of a right horizontal top member (12RHT) which is securely fastened at a front distal end to a right distal end of a front horizontal top member (12FHT) which is securely fastened at a left distal end to a front distal end of the left horizontal top member (12LHT). The left horizontal top member (12LHT) and the rear horizontal top member (12RT) and the right horizontal top member (12RHT) and the front horizontal top member (12FHT) forming a circumference therebetween having sufficient size to accommodate a cooler (20) therein. The front horizontal top member (12FHT) and the front horizontal bottom member (12FBT) further comprises a front-left top-bottom member (12FLTB) and a front-right top-bottom member (12FRTB) therebetween. The rear horizontal top member (12RT) and the rear horizontal bottom member (12RB) further comprise a rear-left top-bottom member (12RLTB) and a rear-right top-bottom member (12RRTB) therebetween.

The vehicle rack system (10) further comprises a left horizontal bottom member (12LHB) securely fastened at a rear distal end to a left distal end of a rear horizontal bottom member (12RB) which is securely fastened at a right distal end to a rear distal end of a right horizontal bottom member (12RHB) which is securely fastened at a front distal end to a right distal end of a front horizontal bottom member (12FHB) which is securely fastened at a left distal end to a front distal end of the left horizontal bottom member (12LHB). The left horizontal bottom member (12LHB) and the rear horizontal bottom member (12RB) and the right horizontal bottom member (12RHB) and the front horizontal bottom member (12FHB) forming a circumference therebetween having sufficient size to accommodate the cooler (20) therein.

The vehicle rack system (10) further comprises a left vertical rear rod holder (12LVR) having a left vertical rear rod holder slotted end (12LVRA) positioned at an upper distal end is securely fastened to a rear end of the left horizontal top member (12LHT) and to a rear end of the left horizontal bottom member (12LBT).

The vehicle rack system (10) further comprises a right vertical rear rod holder (12RVR) having a right vertical rear rod holder slotted end (12RVRA) positioned at an upper distal end is securely fastened to a rear end of the right horizontal top member (12RHT) and to a rear end of the right horizontal bottom member (12RBT).

The vehicle rack system (10) further comprises a left vertical front rod holder receiver (12LVF) is securely fastened to a front end of the left horizontal top member (12LHT) and to a front end of the left horizontal bottom member (12LBT). The left vertical front rod holder receiver (12LVF) comprises a left member (12LA) securely fastened at an upper end. The left member (12LA) comprises a left member holder (12LAA) having a left member holder tension means (12LAAA). The right vertical front rod holder receiver (12RVF) comprises a right member (12RA) securely fastened at an upper end. The right member (12RA) comprises a right member holder (12RAA) having a right member holder tension means (12RAAA). At least one fishing rod holder (14) which comprises a fishing rod holder angled member (14A) having a fishing rod holder angled member slotted end (14AA) is securely fastened at a lower distal end to a fishing rod holder shaft (14B) which is removably insertable into the left vertical front rod holder receiver (12LVF) and the right vertical front rod holder receiver (12RVF).

The vehicle rack system (10) further comprises a right vertical front rod holder receiver (12RVF) is securely fastened to a front end of the right horizontal top member (12RHT) and to a front end of the right horizontal bottom member (12RBT).

The left vehicle connector (18L) comprises a left vehicle connector tab (18LA) which is removably fastenable to the vehicle left tow bracket (22L). The right vehicle connector (18R) comprises a right vehicle connector tab (18RA) which is removably fastenable to the vehicle right tow bracket (22R).

The vehicle rack system (10) further comprises a left vertical middle rod holder (12LVM) having a left vertical middle rod holder slotted end (12LVMA) positioned at an upper distal end is securely fastened to a middle of the left horizontal top member (12LHT) and securely fastened to a middle of the left horizontal bottom member (12LBT). The vehicle rack system further comprises a right vertical middle rod holder (12RVM) having a right vertical middle rod holder slotted end (12RVMA) positioned at an upper distal end is securely fastened to a middle of the right horizontal top member (12RHT) and securely fastened to a middle of the right horizontal bottom member (12RBT).

The vehicle rack system (10) further comprises an optional cutting board (16) removably attachable to a the left member (12LA) and the right member (12RA). The cutting board (16) comprises a cutting board plate (16A) securely fastened along a longitudinal edge to a cutting board cross member (16A) which is securely fastened at opposite distal ends to a cutting board left member (16L) and a cutting board right member (16R). The cutting board left member (16L) is insertable into the left member holder (12LAA) and the cutting board right member (16R) is insertable into the right member holder (12RAA). The left member holder tension means (12LAAA) functions to securely fasten the cutting board left member (16L) to the left member holder (12LAA). The right member holder tension means (12RAAA) functions to securely fasten the cutting board right member (16R) to the right member holder (12RAA).

The vehicle rack system (10) as described in claim 1 is manufactured from a material selected from a group consisting of metal, metal alloy, plastic, plastic composite, rubber, rubber composite, fiberglass, epoxy, carbon graphite, and wood.

It will be understood that each of the elements described above, or two or more together, may also find a useful application in other types of constructions differing from the type described above.

While the invention has been illustrated and described as embodied in a vehicle rack system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vehicle rack system (10) removably connectable to a vehicle (22) having a vehicle left tow bracket (22L) and a vehicle right tow bracket (22R), the vehicle rack system (10) comprising:
   A) a left horizontal top member (12LHT) securely fastened at a rear distal end to a left distal end of a rear horizontal top member (12RT) which is securely fastened at a right distal end to a rear distal end of a right horizontal top member (12RHT) which is securely fastened at a front distal end to a right distal end of a front horizontal top member (12FHT) which is securely fastened at a left distal end to a front distal end of the left horizontal top member (12LHT), the left horizontal top member (12LHT) and the rear horizontal top member (12RT) and the right horizontal top member (12RHT) and the front horizontal top member (12FHT) forming a circumference therebetween having sufficient size to accommodate a cooler (20) therein;
   B) a left horizontal bottom member (12LHB) securely fastened at a rear distal end to a left distal end of a rear horizontal bottom member (12RB) which is securely fastened at a right distal end to a rear distal end of a right horizontal bottom member (12RHB) which is securely fastened at a front distal end to a right distal end of a front horizontal bottom member (12FHB) which is securely fastened at a left distal end to a front distal end of the left horizontal bottom member (12LHB), the left horizontal bottom member (12LHB) and the rear horizontal bottom member (12RB) and the right horizontal bottom member (12RHB) and the front horizontal bottom member (12FHB) forming a circumference therebetween having sufficient size to accommodate the cooler (20) therein;
   C) a left vertical rear rod holder (12LVR) having a left vertical rear rod holder slotted end (12LVRA) positioned at an upper distal end is securely fastened to a rear end of the left horizontal top member (12LHT) and to a rear end of the left horizontal bottom member (12LBT);
   D) a right vertical rear rod holder (12 RVR) having a right vertical rear rod holder slotted end (12RVRA) positioned at an upper distal end is securely fastened to a rear end of the right horizontal top member (12RHT) and to a rear end of the right horizontal bottom member (12RBT);
   E) a left vertical front rod holder receiver (12LVF) is securely fastened to a front end of the left horizontal top member (12LHT) and to a front end of the left horizontal bottom member (12LBT);
   F) a right vertical front rod holder receiver (12RVF) is securely fastened to a front end of the right horizontal top member (12RHT) and to a front end of the right horizontal bottom member (12RBT);
   G) a left vehicle connector (18L) is securely fastened to a left end of the front horizontal bottom member (12FBT) and the rear horizontal bottom member (12RBT), the left vehicle connector (18L) comprises a left vehicle connector tab (18LA) which is removably fastenable to the vehicle left tow bracket (22L); and
   H) a right vehicle connector (18R) is securely fastened to a right end of the front horizontal bottom member (12FBT) and the rear horizontal bottom member (12RBT), the right vehicle connector (18R) comprises a right vehicle connector tab (18RA) which is removably fastenable to the vehicle right tow bracket (22R).

2. The vehicle rack system (10) as described in claim 1 further comprises a left vertical middle rod holder (12LVM) having a left vertical middle rod holder slotted end (12LVMA) positioned at an upper distal end is securely fastened to a middle of the left horizontal top member (12LHT) and securely fastened to a middle of the left horizontal bottom member (12LBT), the vehicle rack system further comprises a right vertical middle rod holder (12RVM) having a right vertical middle rod holder slotted end (12RVMA) positioned at an upper distal end is securely fastened to a middle of the right horizontal top member (12RHT) and securely fastened to a middle of the right horizontal bottom member (12RBT).

3. The vehicle rack system (10) as described in claim 1, wherein the left vertical front rod holder receiver (12LVF) comprises a left member (12LA) securely fastened at an upper end, the left member (12LA) comprises a left member holder (12LAA) having a left member holder tension means (12LAAA), the right vertical front rod holder receiver (12RVF) comprises a right member (12RA) securely fastened at an upper end, the right member (12RA) comprises a right member holder (12RAA) having a right member holder tension means (12RAAA).

4. The vehicle rack system (10) as described in claim 3 further comprises a cutting board (16) removably attachable to a the left member (12LA) and the right member (12RA), the cutting board (16) comprises a cutting board plate (16A) securely fastened along a longitudinal edge to a cutting board cross member (16A) which is securely fastened at opposite distal ends to a cutting board left member (16L) and a cutting board right member (16R), the cutting board left member (16L) is insertable into the left member holder (12LAA) and the cutting board right member (16R) is insertable into the right member holder (12RAA), the left member holder tension means (12LAAA) functions to securely fasten the cutting board left member (16L) to the left member holder (12LAA), the right member holder tension means (12RAAA) functions to securely fasten the cutting board right member (16R) to the right member holder (12RAA).

5. The vehicle rack system (10) as described in claim 1 further comprises at least one fishing rod holder (14) which comprises a fishing rod holder angled member (14A) having a fishing rod holder angled member slotted end (14AA) securely fastened at a lower distal end to a fishing rod holder shaft (14B) which is removably insertable into the left vertical front rod holder receiver (12LVF) and the right vertical front rod holder receiver (12RVF).

6. The vehicle rack system (10) as described in claim 1, wherein the front horizontal top member (12FHT) and the front horizontal bottom member (12FBT) further comprises a front-left top-bottom member (12FLTB) and a front-right top-bottom member (12FRTB) securely fastened therebetween.

7. The vehicle rack system (10) as described in claim 1, wherein the rear horizontal top member (12RT) and the rear horizontal bottom member (12RBT) further comprises a rear-left top-bottom member (12RLTB) and a rear-right top-bottom member (12RRTB) securely fastened therebetween.

8. The vehicle rack system (10) as described in claim 1 is manufactured from a material selected from a group consisting of metal, metal alloy, plastic, plastic composite, rubber, rubber composite, fiberglass, epoxy, carbon graphite, and wood.

* * * * *